United States Patent [19]

Cook et al.

[11] 3,810,027

[45] May 7, 1974

[54] SIGNAL PROCESSING METHOD AND APPARATUS

[75] Inventors: Ronald Cook, Shefford; John Reginald Guppy, Hitchin; John D. Howells, Harpenden, all of England

[73] Assignee: British Aircraft Corporation Limited, London, England

[22] Filed: Jan. 26, 1973

[21] Appl. No.: 327,199

[30] Foreign Application Priority Data

Jan. 31, 1972 Great Britain .................... 4495/72

[52] U.S. Cl. ............ 328/129, 307/235 R, 328/147, 328/151

[51] Int. Cl. ........................................ H03k 5/153

[58] Field of Search ........... 307/235; 328/139, 146, 328/147, 150, 151, 72, 129, 130

[56] References Cited

UNITED STATES PATENTS 3,564,289 2/1971 Smith-Saville ................. 328/151 X 3,602,825 8/1971 Senior ........................... 328/151 X

*Primary Examiner*—John Zazworsky

*Attorney, Agent, or Firm*—Kemon, Palmer & Estabrook

[57] ABSTRACT

In signal-receiving apparatus of the kind having a time-base generator there are alternative ungated and gated input circuits. The receipt of a signal of a level above a predetermined threshold causes the time-base signal levels, at the instant of receipt, to be stored. These stored time-base signals are compared with instantaneous values of time-base signals in a subsequent time-base cycle and identity between the compared signals is caused to switch the gate in the gated input circuit to its signal-passing condition.

6 Claims, 1 Drawing Figure

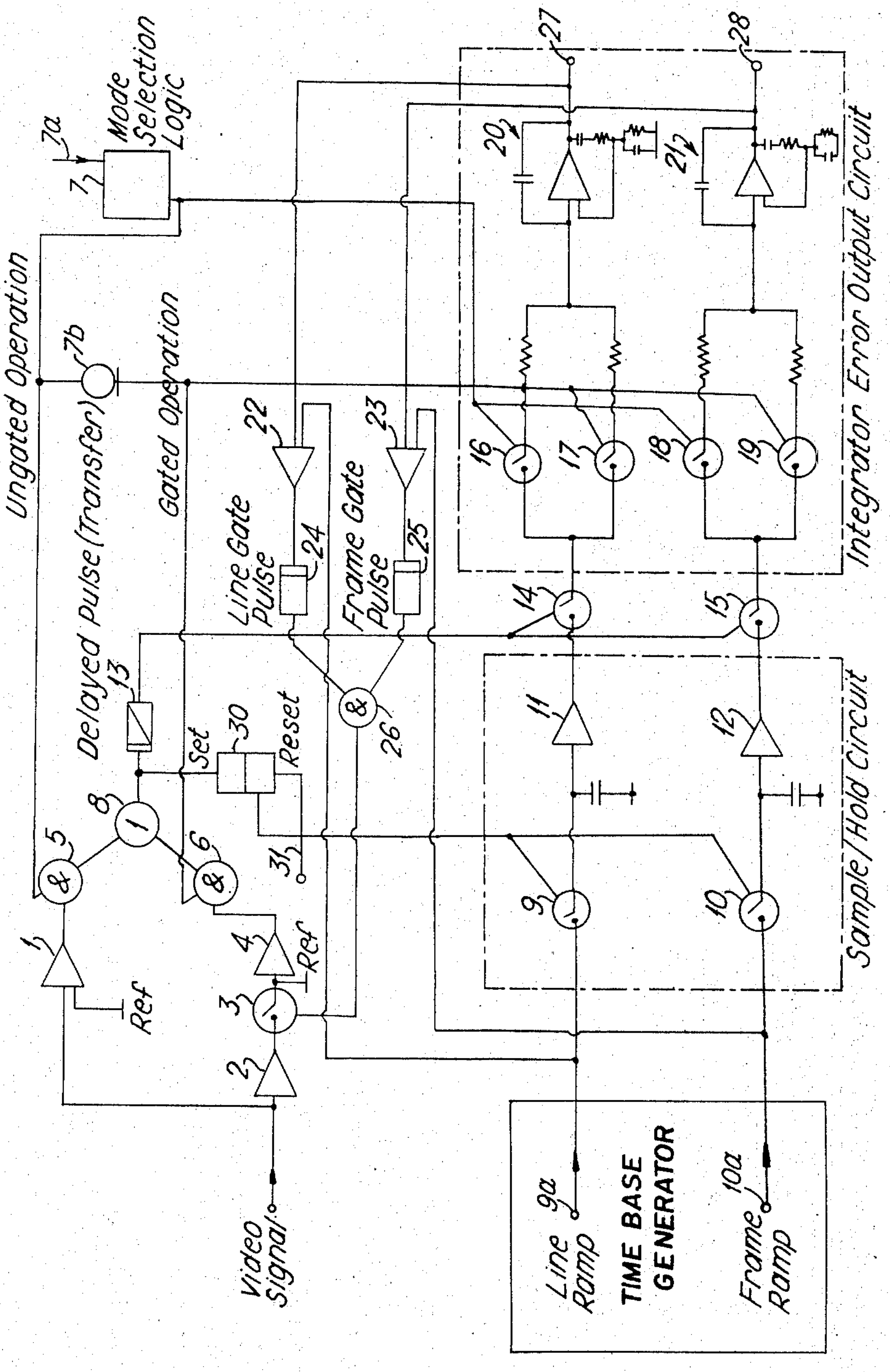
Video Signal
Ref
Ref
Ungated Operation
Delayed Pulse (Transfer)
Gated Operation
Mode Selection Logic
7a
7b
Set
Reset
Line Gate Pulse
Frame Gate Pulse
Sample/Hold Circuit
Integrator Error Output Circuit
TIME BASE GENERATOR
Line Ramp
Frame Ramp
9a
10a
1
2
3
4
5
6
7
8
9
10
11
12
13
14
15
16
17
18
19
20
21
22
23
24
25
26
27
28
30
31

SIGNAL PROCESSING METHOD AND APPARATUS

This invention is concerned with signal processing apparatus of the kind employing a circuit generating time base signals from which the co-ordinates of a signal source may be derived and has a particularly advantageous application to signal tracking systems.

In some signal tracking systems, the split-gate principle is used, the system operating to centre a pair of gating periods, one of which immediately follows the other, about a signal pulse to be tracked.

According to the present invention, the apparatus includes a circuit connected to receive incoming signals and sensitive to the signal amplitude of the incoming signals, a store responsive to a signal from the amplitude-sensing circuit indicative of an incoming signal exceeding a predetermined threshold and operative to store the instantaneous time base signal or signals, a gating circuit connected to receive incoming signals, and a comparator responsive to the stored signal or signals and to the instantaneous time base signal or signals to operate the gating circuit to cause it to pass incoming signals received during the gating period in he scanning cycle defined by the stored time base signal or signals. Thus, the circuit is sensitive to the amplitude of an incoming signal to generate a gating signal at a point in the next information cycle at which the high amplitude signal is anticipated.

In order that the invention may be better understood, one example of a circuit embodying the invention will now be described with reference to the accompanying drawing.

In the drawing, a video signal derived from a camera of the television type is applied to an ungated threshold detector 1 which also receives a reference signal. It is also applied, through an amplifier 2 (if required) to a video gate 3 which, when closed, passes the amplifier output to a second threshold detector 4 which also receives a reference level signal. The outputs of the threshold circuits 1 and 4 are applied respectively to AND gates 5 and 6. The controlling inputs for the gates 5 and 6 are derived from a mode selection logic unit 7 controlled by a signal on line 7*a*. The signal at the output of logic unit 7 has either a logic "1" value or a logic "zero" value. This value is applied directly to the AND gate 5 but is applied through an inverter 7*b* to the AND gate 6. As a result, during ungated operation gate 5 passes any signal from detector 1 but gate 6 is in its blocking condition and during gated operation it is the gate 6 which passes any signal from detector 4 and gate 5 which is in its blocking condition. The outputs of the gates 5 and 6 are connected to an OR gate 8. Thus, at the output of gate 8 there appears the ungated signal or the gated signal, whichever is selected.

In this example, the time base signals for the video signals consist of a line ramp signal at terminal 9*a* and a frame ramp signal at terminal 10*a*. Switching circuits 9 and 10 are closed at the beginning of a frame and apply the line and frame ramp signals to the "sample-and-hold" circuits 11 and 12. A signal from gate 8, indicating that a received video signal exceeds the reference voltage, sets a bistable circuit 30 and thereby opens switching circuits 9 and 10 so that the sample-and-hold circuits 11 and 12 are left with the line and frame ramp values at the moment of opening of the switching circuits 9 and 10. The switching circuits 9 and 10 are again closed at the end of each frame by the resetting of the bistable circuit 30 by a reset pulse on line 31.

The signal from gate 8 is also applied to a delayed pulse generator 13, the delayed output of which acts to close switching circuits 14 and 15. Circuit 14, when closed, transfers the signal from circuit 11 to the inputs of further switching circuits 16 and 17. Circuit 15 similarly transfers the signal from circuit 12 to further switching circuits 18 and 19. During ungated operation switching circuits 16 and 18 are closed by a signal from logic unit 7 and during gated operation switching circuits 17 and 19 are closed by the inverted signal from circuit 7*b*. The closed switches transfer the sampled line and frame information to the output integrators 20 and 21. These integrators contain rate feed back loops which smooth out the sampled information and seek to maintain established rates. They provide output signals at terminals 27 and 28 which represent the sampled values after integration. The use of alternative switches for gated and ungated operation permits different integrator output rate limits for the two modes of operation.

The stored output signals from one frame of video information which appear at the outputs of integrators 20 and 21 are also applied to comparators 22 and 23. These comparators also receive directly the instantaneous values of the line and frame ramp voltages from the time base terminals 9*a* and 10*a* and they generate pulses whenever the stored values are equal to the instantaneous values of the time base voltages. The coincidence signals produced by the line and frame comparators 22 and 23 are applied to pulse generators 24 and 25. When the signals from these pulse generators coincide, a gate 26 closes the video gating circuit 3 to permit the video signal to pass to the threshold detector 4. Thus when, during ungated operation, a signal exceeding the predetermined threshold for detector 1 has been detected, then for subsequent operation the corresponding incoming signal is also applied to the threshold detector 4 through the video gate 3. If ungated operation continues, the output of detector 4 is not used and the output of detector 1 continues to control the signals at terminals 27 and 28. If however the mode selection logic circuit is switched to gated operation, the output of detector 1 will be ineffective and the incoming signal will be gated in each cycle by the gating circuit 3 so that only signals occurring in the vicinity of the previously detected signal are passed through the AND gate 6 to the OR gate 8. Sample-and-hold operations now continue in response to gated video signals only.

The controlled signal for the mode selection circuit 7 may be governed by a number of factors, for example the signal-to-noise ratio, and loss of data.

Gated operation in the circuit described has the advantage that the amplitude-dependent threshold in use is not exposed to signals outside the field of interest. Also, the effect of unwanted signals appearing within the gate (the width of which must exceed the pulse width of interest to accommodte the requirements imposed by finite data rates, practical gate width tolerances, potential tracking rates and so on) may be drastically reduced by control of the "update rate" capability of the output integrators. With the circuit described, ratelimiting is easily defined without regard to the shape of the pulse. In this respect, and also in the relative simplicity of apparatus embodying the amplitude gate system, the circuit described compares favourably with a split-gate detector. The use of the rate feed back loops in the output integrators not only smooth the sampled information and improve the gate position information but, since they contribute to the integrator output rate in a further integrative manner, the response of the output integrator to isolated interfering pulses appearing within the gate may be further reduced.

In addition, no transient occurs on transition between modes at the output signals of integrators 11 and 12 and mode switching is very simple. Finally, the relative independence of gate "rate sensitivity" and video signal permits a different set of compromises in system parameters from those of a split gate and gives a more predictable gate performance.

Switches 16 to 19 control the effective integrator time constants and operate in conjunction with limiters (not shown) to control the rate at which error signals can change. For example, at acquisition, the system must be in ungated mode and the gate may be positioned anywhere. The errors have to take up their correct levels very rapidly and a high following rate capability is required. Once the gate is positioned, a signal having an abnormally high rate is unlikely to be a required signal and can be ignored, i.e., one can restrict the rate-following capability and so discriminate against unwanted signals — hence two following rates, one for acquisition and one for gated operation.

We claim:

1. Signal receiving apparatus of the kind including a circuit generating a time base signal and thereby defining a succession of cycles for scanning an incoming signal of a periodic nature, the apparatus further comprising: a circuit connected to receive the incoming signal and sensitive to the amplitude of the incoming signal; a store responsive to a signal output from said circuit indicative of an incoming signal exceeding a predetermined threshold and operative to store the instantaneous value of the time base signal, the said stored instantaneous value defining a time point within the scanning cycle; a gating circuit connected to receive incoming signals; and a comparator responsive to the stored signal and to the instantaneous value of the time base signal and operative when the said instantaneous value reaches the stored value to render said gating circuit conductive, whereby said gating circuit is enabled to pass an incoming signal received at the said time point, defined by the stored signal, in the scanning cycle.

2. Apparatus in accordance wth claim 1, including a control circuit for said store whereby said store is alternatively responsive to a signal from the said amplitude-sensitive circuit indicative of an incoming signal exceeding a predetermined threshold and to a signal passed through said gating circuit.

3. Apparatus in accordance with claim 2, including a further amplitude-sensitive circuit connected between said gating circuit and said control circuit for said store.

4. Apparatus in accordance with claim 2, in which said store includes an integrator circuit having first and second branches with different parameter values, and a selector circuit operative in a first mode to apply a signal from said amplitude-sensitive circuit to said store and also to render said first circuit branch of said integrator circuit effective and said second circuit branch ineffective, and operative in a second mode to apply a signal passed through said gating circuit to said store and also to render said second circuit branch of said integrator circuit effect and said first circuit branch ineffective.

5. Apparatus in accordance with claim 4, in which integrator has a rate feedback loop.

6. Apparatus in accordance with claim 7, in which the circuit generating the time base signal includes means for generating line and frame ramp signals, said store including two sampling circuits responsive to a signal from said amplitude sensitive circuit indicating the presence of an incoming signal above the predetermined threshold to sample the line and frame ramp signals.

* * * * *